United States Patent [19]

Nilsson et al.

[11] Patent Number: 4,975,831
[45] Date of Patent: Dec. 4, 1990

[54] HIGH-AVAILABILITY COMPUTER SYSTEM WITH A PREDEFINABLE CONFIGURATION OF THE MODULES

[75] Inventors: Sven-Axel Nilsson, Deisenhoffen, Fed. Rep. of Germany; David Budde, Portland, Oreg.

[73] Assignee: Intel Corporation, Santa Clara, Calif.

[21] Appl. No.: 191,629

[22] Filed: May 9, 1988

[51] Int. Cl.⁵ .................. G05F 9/02; G05F 13/00
[52] U.S. Cl. .................. 364/200; 364/280.2; 364/900; 364/975.2; 364/949.4; 364/946.4
[58] Field of Search ... 364/200 MS File, 900 MS File; 371/11.3

[56] References Cited

U.S. PATENT DOCUMENTS

| | | | |
|---|---|---|---|
| 4,236,207 | 11/1980 | Rado et al. | 364/200 |
| 4,268,901 | 5/1981 | Subrizi et al. | 364/200 |
| 4,556,953 | 12/1985 | Caprio et al. | 364/900 |
| 4,622,633 | 11/1986 | Ceccon et al. | 364/200 |
| 4,654,787 | 3/1987 | Finnell et al. | 364/200 |
| 4,701,878 | 10/1987 | Günkel et al. | 364/900 |
| 4,860,196 | 8/1989 | Wengert | 364/200 |
| 4,912,709 | 3/1990 | Teske et al. | 371/22.1 |

*Primary Examiner*—Michael R. Fleming
*Assistant Examiner*—Gopal C. Ray

*Attorney, Agent, or Firm*—Owen L. Lamb

[57] ABSTRACT

A computer system operative during an initialization phase to initialize modules of the system and during a subsequent non-initialization phase to transfer information between the initialized modules. A module bus (MB) has 32 signal lines beginning with a least-significant-bit signal line and ending with a most-significant-bit signal line. The bus (MB) connects the modules for data transfers after the initialization phase over bidirectional address lines and data lines connected to the module bus. A system support module (SSMI) starts the initialization phase by energizing an initialization signal line (INIT). In response, a processor (GDP) generates identification command information over the bus (MB) that continas a first data record and a second data record. The first data record is comprised of bits equal to the number of signal lines in the 32-bit module bus, with only one logical one in the first data field, the position of the logical one advancing consecutively from the least significant bit position to the most significant bit position for each successive identification command generated by the processor. The second data record is an identification code uniquely identifying the one of the modules activated by the first record to receive the second record and hence its identification code.

4 Claims, 2 Drawing Sheets

HIGH-AVAILABILITY COMPUTER SYSTEM WITH A PREDEFINABLE CONFIGURATION OF THE MODULES

FIELD OF THE INVENTION

This invention relates to electronic data processing systems and more particularly to the apparatus of a high availability computer system with a predefinable module configuration.

BACKGROUND OF THE INVENTION

In high-availability computer systems it is necessary that the usually numerous modules involved in data processing be made identifiable and that, within certain limits, tasks and priorities be assigned to the modules. Said procedures are to be carried out before the startup of the computer system. These goals are accomplished either by providing electronic identification sources, i.e., ROM or other hardware devices, i.e., switches, solder straps, etc., or on the other hand by implementing software-controlled transmissions of appropriate bit masks over the data and address buses. In the latter case, separate decoders are further required for nearly every module; these decoders decode and generate the identification commands from the transmitted signals typically referred to as chip select signals. The possibilities for identification are, however, restricted by the corresponding hardware cost, the capability of the decoders, switches, etc., and by the limited time available for initialization of the system.

SUMMARY OF THE INVENTION

It is an object of this invention to implement in a high availability computer system an apparatus for a simple and high speed identification procedure such that a flexible user-predefined configuration can be created during the initialization phase without major added hardware cost.

Briefly stated, in accordance with one aspect of the invention, the foregoing objects are achieved by providing a high availability computer system having a plurality of VLSI modules including at least one processor module connected to a 32 bit wide module bus. The processor module includes bi-directional address lines and data lines connected to said module bus, and is pre-defined as a core processor. A memory array, including two memory control unit modules each connected by said module bus, and each said memory control unit is assigned to said core processor. A system bus is connected to bus extension units, with a first bus extension unit module connecting said processor module to the system bus and a second and third bus extension unit module connecting each of said memory control unit modules to the system bus. At least one power supply module is provided having a system support module which generates an initialization signal upon being switched on. The said system support module includes an initialization signal line over which said initialization signal is transmitted to begin an initialization phase of the computer system. At least one parameter controller module, with the parameter controller, said processor module, said memory control units module, and said plurality of bus extension unit module, each connected to said initialization signal line by an initialization identification pin which connects to a respective line of said module bus. The pre-defined core processor, during the initialization phase of the computer system sequentially transmits a logic "1" over each respective line of the 32 bit wide module bus while all remaining lines are held at logic zero, beginning at a least significant bit line of said module bus and ending with a most significant bit line of said module bus. And, each module receives a logic "1" through its respective initialization identification line simultaneously with the transmission of one of the sequential initialization phase signals on the module bus and receives identification information through a communication pin, said identification information is generated by the core processor module and the identification information assigns identification numbers to the modules for deriving the configuration of the computer system.

In many cases, advantageous use can be made of identical modules that are allocated a definite function or priority, or even just an identification, through the flexible assignment of tasks. For example, if there are a large number of processor modules, it is possible to define them in pairs, in which one module functions as a MASTER and the other as a CHECKER, i.e., as a monitoring processor operating in the background. The configuration is created for the entire computer system at one time during the initialization phase and is controlled only through the bus. The actual reading-in of the identification signals is performed serially through the communications pins of the modules. Which processor of the computer is defined as the core processor and controls the identification process can be defined by simple hardware or firmware means on the card.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
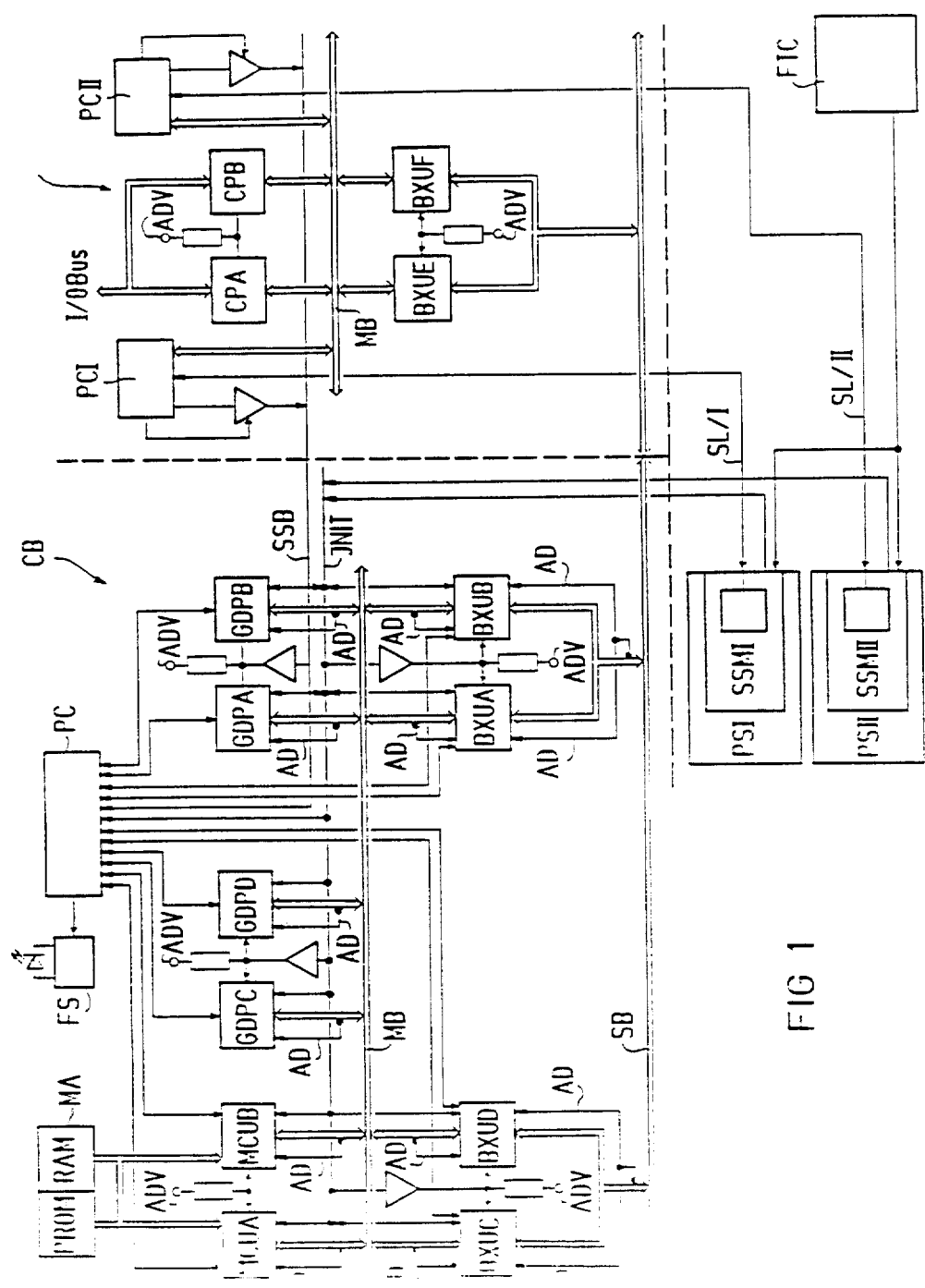
FIG. 1 is a block diagram of a preferred embodiment of a high-availability computer system.

FIG. 1 illustrates a computer system through a block diagram of a computational board CB on which there are four processor modules GDPA, GDPB, GDPC and GDPD: GDP is defined as a general data processor. Like most of the computer modules mentioned below, the processor modules are VLSI components. The data and address lines of the processor modules GDPA through GDPD are connected to a common module bus MB. Each pair of processor modules GDPA and GDPB or GDPC and GDPD form a unit, in which one of the modules, as controlled by hardware or software, is assigned the MASTER function, or the subordinate CHECKER function. In the present circuit embodiment, the processor modules GDPA and GDPB are each connected, by way of the module bus MB, to bus extension units BXUA and BXUB, which in turn have their data and address lines connected to a system bus SB, which represents the central bus for all cards and modules in the computer system.

On the computational board CB there is also a memory array MA, which consists of a programmable read-only memory PROM and read-write random access memory, RAM. The read-write output and input of the memory array MA are likewise connected to the module bus MB by means of memory control units MCUA and MCUB. Each of the processor modules GDPA through GDPD, the memory control units MCUA and MCUB, and the bus extension units BXUA and BXUB, also have available a communications input COM, which in each case is connected to a pin on a parameter controller PC. An example of a device that can be used as the parameter controller is the 8051 microprocessor made by Intel. At further inputs of the parameter controller PC, certain word parameters of the computational board can be externally set by analog or digital setting means. Here an error-message unit FS is connected through one output of the parameter controller PC; the error-message unit can send a signal if an error occurs in the modules monitored by the parameter controller module PC.

On the computational board CB there is also an initialization line INIT, to which the modules GDPA through GDPD, the bus extension units BXUA through BXUD, and the memory control units MCUA and MCUB are connected.

Further shown in FIG. 1 is a serial system bus SSB, by means of which the parameter controller modules PC of the various computational boards are connected to one another. A detailed functional description of the modules shown in FIG. 1 follows below.

In the right-hand portion of FIG. 1 there is also a block diagram of the input-output card I/O of the computer system described here. The circuit card contains two channel processors CPA and CPB, one as MASTER and the other as CHECKER, the outputs of which are connected to the input-output bus of the entire computer system. The channel processors CPA and CPB are connected, by means of bus extension units BXUE and BXUF, to a module bus MB, which is structured similarly to the module bus in FIG. 1. Said bus extension units BXUE and BXUF are in turn connected to the system bus SB that is common to the entire computer system. Also present on the input-output card I/O are parameter controllers PC/I and PC/II, which are likewise connected to the module bus MB present here and which are each further connected, by means of coupling modules K/I and K/II, to the above-mentioned serial system bus SSB. Through an additional serial line interconnection SL, each of the parameter controllers PC/I and PC/II is connected to a power supply module PS, described in more detail below.

The bottom portion of FIG. 1 shows an overall plan of two power supply modules PS/I and PS/II, which are essentially identical. In addition to the power supply pins not shown here, the power supply modules PS/I and PS/II have two system support modules SSM/I and SSM/II, each of which is provided with a microprocessor, such as, for example, an Intel 8051. Said microprocessors are each connected, through the serial connecting line SL/I or SL/II, to one of the parameter controllers PC/I or PC/II on the input-output card. Further outputs of the system support modules SSM/I and SSM/II are the initialization lines INIT/I and INIT/II, which control the startup phase of the computer system and with which the INIT lines described above are coupled.

Initialization is an essential function on the startup or restart of the entire computer system after an alteration of its previous configuration. After repair and/or addition, it is therefore necessary to identify and parametrize all VLSI components and the other physical and logical components of the system.

Immediately after the system has been turned on, i.e., a cold startup, or part of the system has been restarted, i.e., a warm startup, all components are initialized, as predefined by software or hardware, during an INIT signal emitted by the system support modules SSM or received over the system bus. An identification phase follows, during which the identity of the VLSI components is established. Next, in the parametrization phase, parameters are loaded into the appropriate registers of the VLSI components, preferably through the parameter controller PC; said parameters depend on the configuration of the system and on several controllable factors and may deviate from the predefined values in the first phase of initialization. The two phases are executed primarily via the COM pins of the VLSI components, the registers in the components being loaded serially.

Figure 2:
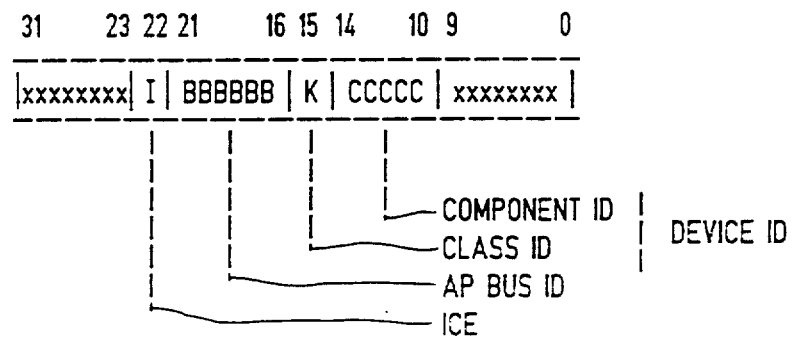
FIG. 2 shows an example of the contents of an identification code.

FIG. 2 shows an example of an identification code such as can be read serially into the registers of the VLSI components by an identify device command. The bits in positions 10 to 22 are of particular significance here.

Positions 10 to 14 are reserved for component identification CID; the corresponding register positions display the values 00000 as defaults. When the configuration is altered, the CID code can be altered by overwriting the register.

In the class identification KID (position 15), two classes of VLSI components are distinguished by having memory components with a KID=0, and non-memory components with a KID=1. The in-circuit-emulation ICE bit (position 22) serves to distinguish components that during a test phase are VLSI components to be tested, which have ICE reset to 0; or are VLSI components available for emulation testing purposes which have ICE set to 1.

Positions 16 through 21 serve to identify the system bus SB or module bus MB to which the VLSI components are connected. Said register positions exhibit 000000 as default values and are specified or overwritten by a bus identification command BID. The appropriate identification bits are assigned under software control and take into account, among other things, the identity of the subsystem or of the card cage or extension module to which the VLSI components are connected by means of the card.

The physical identification mechanism with the corresponding commands is controlled by means of a microcode implemented in the processor modules. In order to identify the applicable component identification input, each VLSI component exhibits an INITID input, each of which is connected to one line of the 32-bit-wide module bus MB or system bus SB. Thus, a maximum of 32 components can be identified and called upon. The commands are sent by whichever one of the processor modules GDPA or GDPB was defined as the core processor in the predefinition phase.

Every identification command contains, as its first data record, a data field of 32 bits, i.e., 4 bytes, with only one each logical 1 in the field; the position of the logical 1 advances consecutively from the least significant to the most significant bit.

| | | | | | |
|---|---|---|---|---|---|
| 00000000 | 00000000 | 00000000 | 00000001 | = CID | 0 |

-continued

| 00000000 | 00000000 | 00000000 | 00000010 | = | CID | 1 |
| --- | --- | --- | --- | --- | --- | --- |
| 00000000 | 00000000 | 00000000 | 00000100 | = | CID | 2 |
| . | . | . | . | . | . | . |
| . | . | . | . | . | . | . |
| . | . | . | . | . | . | . |
| 1000000 | 00000000 | 00000000 | 00000000 | = | CID | 31 |

If a VLSI component sees a logic 1 and thus the identification command at its INITID input, the subsequent component identification signal CID, which is the second data record transmitted on the bus, is read as the now applicable CID code and stored in the appropriate register positions as shown in FIG. 2.

Example:

| Data word 1 | 00000000 | 00000000 | 00000000 | 00000100 |
| --- | --- | --- | --- | --- |
| Data word 2 | xxxCCCCC | xxBBBBBB | xCCCCCxx | xxxCCCCC |

Here the fields with C's contain the component identification, and the fields with B's contain the bus identification BID.

In accordance with the identification procedure described above, the bus extension units BXUA through BXUD are also considered VLSI components to be identified. As a part of the identification procedure, a local identification, i.e., CID and BID, is carried out by means of the local module bus MB. The sequence of identification commands is transmitted through each bus extension unit BXU to the system bus side of said bus extension unit BXU. Said transmission also takes place in the reverse direction when a correction is made to the identification. In the case where a number of cards are to be inserted in card cages of the system and the said card cages, however, all share a common system bus SB, both the card cage and the card must be specially identified.

In the example illustrated in FIG. 1, the two processor modules GDPA and GDPB operate as core processors, since they are instructed by the application of a d.c. signal essentially equal to Vcc through the respective pins MDCHK, to function as the core processor. Modules not operating as the core processor have their MDCHK pin grounded. The two processor modules GDPC and GDPD are present for redundancy, performing a shadow function; this determination is made by sending a HIGH or LOW signal to an appropriate pin ADV under hardware control.

A different configuration is also possible. The processor modules GDPA and GDPB are a MASTER/CHECKER pair, which starts and controls the initialization phase. The memory control units MCUA and MCUB are directly assigned to the processor modules GDPA and GDPB by means of an appropriate component identification CID=4. The data traffic with the system bus SB and thus to other portions of the computer system, for example to the input-output card I/O, is handled by the bus extension units BXUA and BXUB or BXUC and BXUD.

The processor module GDPA has its INITID pin connected to the line AD4 of the module bus MB and here receives its component identification CID. The MASTER function is assigned to it, because the signal at its COM pin is HIGH.

The processor module GDPB likewise has its INITID pin connected to the line AD4 for identification, e.g., CID=4; it, however, is defined as a CHECKER during the INIT phase by a LOW signal.

In the same manner, the memory control unit MCUA is defined as a MASTER and the memory control unit MCUB is defined as a CHECKER. The processor modules GDPC and GDPD are connected to the line AD3 and take only a passive part in the system identification; here too, however, the MASTER/CHECKER distinction has been made.

In the case of the bus extension units, MASTER/CHECKER properties are assigned in accordance with the processor modules or memory control units connected to each.

In a further identification phase, the bus extension units read, on the system bus side at their INITID pins, the identifications of the system or the module number, which is then entered into the appropriate register positions. With said entry, any corresponding predefinitions of the further VLSI components connected to the module bus are corrected and adapted to the actual configuration of the system.

It will now be understood that there has been disclosed an improved system for implementing a high availability computer system with a predefinable configuration of modules in a simple and high speed manner. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A high-availability-computer system having a plurality of VLSI modules, said system operative during an initialization phase to initialize said modules and during a non-initialization phase subsequent to said initialization phase to transfer information between the modules initialized during said initialization phase comprising:
  a multi-bit wide module bus having a plurality of signal lines beginning with a least-significant-bit signal line of said module bus and ending with a most-significant-bit signal line of said module bus;
  a processor module connected to said module bus;
  said processor module having bidirectional address lines and data lines connected to said module bus;
  a memory array, having two memory-control-unit modules, each connected to said module bus for exchanging address and data with said processor module over said bidirectional address and data lines;
  a system bus;
  a first bus extension-unit module connecting said processor module to said system bus;
  a second and third bus extension-unit module connecting each of said memory control unit modules to said system bus;
  a power-supply module having a system support module which generates an initialization signal upon switching on;
  said system support module having an initialization signal line connected to each of said VLSI modules over which said initialization signal is transmitted to begin said initialization phase of said computer system;

said processor module, said memory-control-unit modules, and said bus extension-unit modules each being provided with an initialization identification pin;

said processor module, said memory-control-unit modules, and said bus extension-unit modules each having its respective initialization identification pin connected to a respective different signal line of said module bus;

identification command generating means in said processor, connected to said module bus, for generating successive identification command information, which identification command information firstly activates a module to receive information and secondly assigns an identification code to the activated module;

each of said identification commands containing a first data record and a second data record, said first data record being comprised of a first data field of bits equal to the number of signal lines in said multi-bit module bus, with only one logical one in said first data field, the position of said logical one advancing consecutively from said least significant bit position to said most significant bit position for each successive identification command generated by said identification command generating means in said processor; and, said second data record being comprised of a second data field of bits which include an identification code uniquely identifying the one of said modules activated over its initialization identification pin by said first record to receive said second record and hence its identification code.

2. A high-availability-computer system according to claim 1 wherein each VLSI module has a respective identification register for receiving said second data record.

3. A high-availability-computer system according to claim 1 wherein said multi-bit wide module bus is a 32-bit wide bus comprised of 32 signal lines.

4. A high-availability-computer system according to claim 1 wherein:

said second data record comprised of a second data field of bits includes a component identification and a class identification by which said VLSI modules are distinguished into memory and non-memory classes.

* * * * *